(12) United States Patent
Nakagawa et al.

(10) Patent No.: US 10,008,892 B2
(45) Date of Patent: Jun. 26, 2018

(54) IPM MOTOR FOR VACUUM PUMP

(71) Applicant: Edwards Japan Limited, Yachiyo-shi, Chiba (JP)

(72) Inventors: Isao Nakagawa, Kitakyushu (JP); Manabu Nonaka, Chiba (JP)

(73) Assignee: Edwards Japan Limited, Chiba (JP)

( * ) Notice: Subject to any disclaimer, the term of this patent is extended or adjusted under 35 U.S.C. 154(b) by 254 days.

(21) Appl. No.: 14/403,164

(22) PCT Filed: Mar. 27, 2013

(86) PCT No.: PCT/JP2013/058952
§ 371 (c)(1),
(2) Date: Nov. 21, 2014

(87) PCT Pub. No.: WO2013/179749
PCT Pub. Date: Dec. 5, 2013

(65) Prior Publication Data
US 2015/0108867 A1 Apr. 23, 2015

(30) Foreign Application Priority Data
May 31, 2012 (JP) ................................ 2012-125326

(51) Int. Cl.
*H02K 1/27* (2006.01)
*F04D 19/04* (2006.01)
(Continued)

(52) U.S. Cl.
CPC ............. *H02K 1/276* (2013.01); *F04B 37/14* (2013.01); *F04D 19/042* (2013.01);
(Continued)

(58) Field of Classification Search
CPC ........ H02K 1/22; H02K 1/2766; H02K 21/12; H02K 21/16
See application file for complete search history.

(56) References Cited

U.S. PATENT DOCUMENTS 5,962,944 A * 10/1999 Narita ................... H02K 1/276
                                                        310/112
2005/0104468 A1* 5/2005 Araki ................. H02K 1/2766
                                                        310/156.53
(Continued)

FOREIGN PATENT DOCUMENTS

EP          1265338 A2    12/2002
JP       2000-245085 A     9/2000
(Continued)

OTHER PUBLICATIONS

Translation of the International Search Report received in PCT/JP2013/058952 dated May 14, 2013, 2 pages.
(Continued)

Primary Examiner — Tran Nguyen
(74) Attorney, Agent, or Firm — Shumaker & Sieffert, P.A.

(57) ABSTRACT

An IPM motor for a vacuum pump suitable for use as a motor for a small vacuum pump is provided. The IPM motor for a vacuum pump includes: a rotor core in which a rotor shaft of the vacuum pump is pressed and which also has magnets embedded therein; and a stator core which surrounds the rotor core and around which stator windings are wound. The magnets per pole embedded in the rotor core are each split into two pieces and inserted in respective magnet slots in the rotor core. A hole for stress concentration relaxation is provided at either end of each pair of magnet slots in which permanent magnets split into two pieces are embedded in each pole. The rotor core has a multilayer structure having a plurality of rotor core laminations stacked vertically in an axial direction of the rotor shaft. The rotor core laminations stacked vertically are positioned with a skew angle determined by using the holes for stress concentration relaxation.

4 Claims, 11 Drawing Sheets

(51) Int. Cl.
    *F04D 25/06*     (2006.01)
    *H02K 21/16*     (2006.01)
    *H02K 7/14*     (2006.01)
    *F04B 37/14*     (2006.01)

(52) U.S. Cl.
    CPC ........... *F04D 25/0606* (2013.01); *H02K 7/14* (2013.01); *H02K 21/16* (2013.01); *H02K 2201/06* (2013.01)

(56) References Cited

U.S. PATENT DOCUMENTS

| | | | |
|---|---|---|---|
| 2007/0063607 A1 | 3/2007 | Hattori | |
| 2007/0222319 A1 | 9/2007 | Yoshikawa et al. | |
| 2009/0079287 A1* | 3/2009 | Hattori | H02K 1/2766 |
| | | | 310/156.53 |
| 2010/0026128 A1* | 2/2010 | Ionel | H02K 1/276 |
| | | | 310/156.53 |
| 2011/0012464 A1* | 1/2011 | Lee | H02K 1/276 |
| | | | 310/156.53 |

FOREIGN PATENT DOCUMENTS

| | | |
|---|---|---|
| JP | 2002044887 A | 2/2002 |
| JP | 2002-364541 A | 12/2002 |
| JP | 2007-159281 A | 6/2007 |
| JP | 2009-225519 A | 10/2009 |
| JP | 2010035264 A | 2/2010 |
| JP | 2010-178471 A | 8/2010 |
| JP | 2011199945 | 10/2011 |

OTHER PUBLICATIONS

Extended Search Report from counterpart European Application No. 13797475.4, dated Jun. 23, 2016, 6 pages.

\* cited by examiner

IPM MOTOR FOR VACUUM PUMP

This application is a national stage entry under 35 U.S.C. § 371 of International Application No. PCT/JP2013/058952, filed Mar. 27, 2013, which claims the benefit of JP Application 2012-125326, filed May 31, 2012. The entire contents of International Application No. PCT/JP2013/058952 and JP Application 2012-125326 are incorporated herein by reference.

BACKGROUND

A vacuum pump draws air by rotating at a high speed a plurality of rotor blades opposite a plurality of stator blades attached to an inner wall of a housing. To rotate the rotor blades at a high speed, a brushless DC motor having an surface permanent magnet (SPM) design has conventionally been used.

The SPM motor of this type has a rotor with magnets bonded on its surface and therefore requires a bind for preventing the magnets from flying away by the centrifugal force during the high-speed rotation. Moreover, the loss of energy dissipated as heat occurs due to eddy currents in the magnets, because the magnets used for the SPM are large.

Accordingly, introduction of interior permanent magnet (IPM) motors for use in vacuum pumps has been discussed with a view to reducing the amount of magnets, simplifying the shape of the magnets, and reducing the number of components by omitting the bind for preventing the magnets from flying away.

The IPM motor is a synchronous motor with magnets embedded inside the rotor to produce rotating magnetic fields and capable of outputting large power despite the small size thereof, as it can use both reluctance torque generated by rotor magnetization and magnet torque given by the magnets.

To use this IPM motor as the motor for a vacuum pump, a rotor shaft for rotating the rotor blades of the vacuum pump at a high speed needs to be pressed into a rotor part of the IPM motor. The rotor shaft of the vacuum pump needs to have a diameter of a certain value or more so as to reduce natural vibration during high-speed rotation of the vacuum pump, so that, the rotor of the IPM motor in which magnets are embedded has to have a very small yoke width. If the magnet of each pole consists of a single magnet, the rotor yoke width may be too small for the rotor core or magnets to be able to mechanically withstand the pressure during the process of pressing in the shaft of the vacuum pump, and the rotor core or magnets may break.

"Motor rotor" described in Japanese Patent Application Laid-open No. 2002-44887 is known as a rotor for an IPM motor configured with two magnets per one pole.

SUMMARY

However, the "motor rotor" described in Japanese Patent Application Laid-open No. 2002-44887 is not intended to be used as the motor for a small vacuum pump, and therefore cannot prevent breakage of the rotor core or magnets during pressing-in of the shaft because of the rotor yoke width being made smaller.

The present invention was devised to solve this problem and it is an object of the invention to provide an IPM motor suitable for use as the motor of a small vacuum pump.

To achieve the above object, the present invention provides an IPM motor for a vacuum pump, including: a rotor core into which a rotor shaft of the vacuum pump is pressed and which also has magnets embedded therein; and a stator core which surrounds the rotor core and around which stator windings are wound, wherein the magnets per pole embedded in the rotor core are each split into a plurality of pieces and inserted in respective magnet slots in the rotor core, and holes for stress concentration relaxation are provided near the magnet slots.

In this configuration, the magnets per pole embedded in the rotor core are each split into at least two pieces and inserted in the respective magnet slots in the rotor core.

The magnet slots may have a first corner portion for stress concentration relaxation at a corner on a radially outer side, and a second corner portion with a smaller radius of curvature than that of the first corner portion at a corner on a radially inner side.

In this configuration, the rotor core may have a multilayer structure having multiple-stage rotor core laminations stacked in an axial direction of the rotor core, a skew angle of the stacked rotor core is determined by using the holes for stress concentration relaxation.

The rotor core may have a multiple layer structure having at least two rotor core laminations vertically in an axial direction of the rotor core.

The skew angle between the multiple-stage rotor core laminations is adjusted by forming the holes for stress concentration relaxation of adjacent poles such that these holes have different distances therebetween.

The skew angle between two-stage rotor core laminations that are stacked vertically is adjusted by forming the holes for stress concentration relaxation of adjacent poles such that these holes have different distances therebetween.

In this configuration, a distance between the holes for stress concentration relaxation is set to be wider than a distance between the holes for stress concentration relaxation and the magnet slots, whereby a magnetic circuit is formed so that the magnetic circuit extends across the multiple-stage rotor core laminations by passing a q-axis magnetic flux that generates reluctance torque between the holes for stress concentration relaxation of respective rotor core laminations.

Moreover, a distance between the holes for stress concentration relaxation is set to be wider than a distance between the holes for stress concentration relaxation and the magnet slots, whereby a magnetic circuit is formed so that the magnetic circuit extends across the two-stage rotor core laminations that are stacked together with each other by passing a q-axis magnetic flux that generates reluctance torque between the holes for stress concentration relaxation of the upper rotor core lamination and between the holes for stress concentration relaxation of the lower rotor core lamination.

According to the present invention, the magnets per pole embedded in the rotor core are each split into a plurality of pieces and inserted in respective magnet slots of the rotor core, and a hole for stress concentration relaxation is formed at either end of each plurality of magnet slots with respect to each pole in which the plurality of split pieces of magnets are inserted, whereby breakage of the rotor core or magnets which may be caused by pressure during pressing-in of the shaft can reliably be prevented.

With the provision of through holes for stress concentration relaxation, as well as the configuration of the magnet slot with a shape including a first corner portion for stress concentration relaxation on a side adjacent the hole for stress concentration relaxation and at a corner on a radially outer side, and a second corner portion with a smaller radius of curvature than that of the first corner portion at a corner on a radially inner side, possible breakage of rotor core due to the centrifugal force during high-speed rotation of the vacuum pump can be prevented.

The holes for stress concentration relaxation can be used for positioning the upper and lower rotor core laminations with a skew angle when forming a multilayer structure with a stack of rotor core laminations stacked together with each other in an axial direction of the rotor shaft.

The holes for stress concentration relaxation also provide an effect of reducing magnetic flux leakage from magnet ends.

DETAILED DESCRIPTION

Hereinafter, embodiments of the present invention will be described in detail with reference to the drawings attached to the application.

Figure 1:
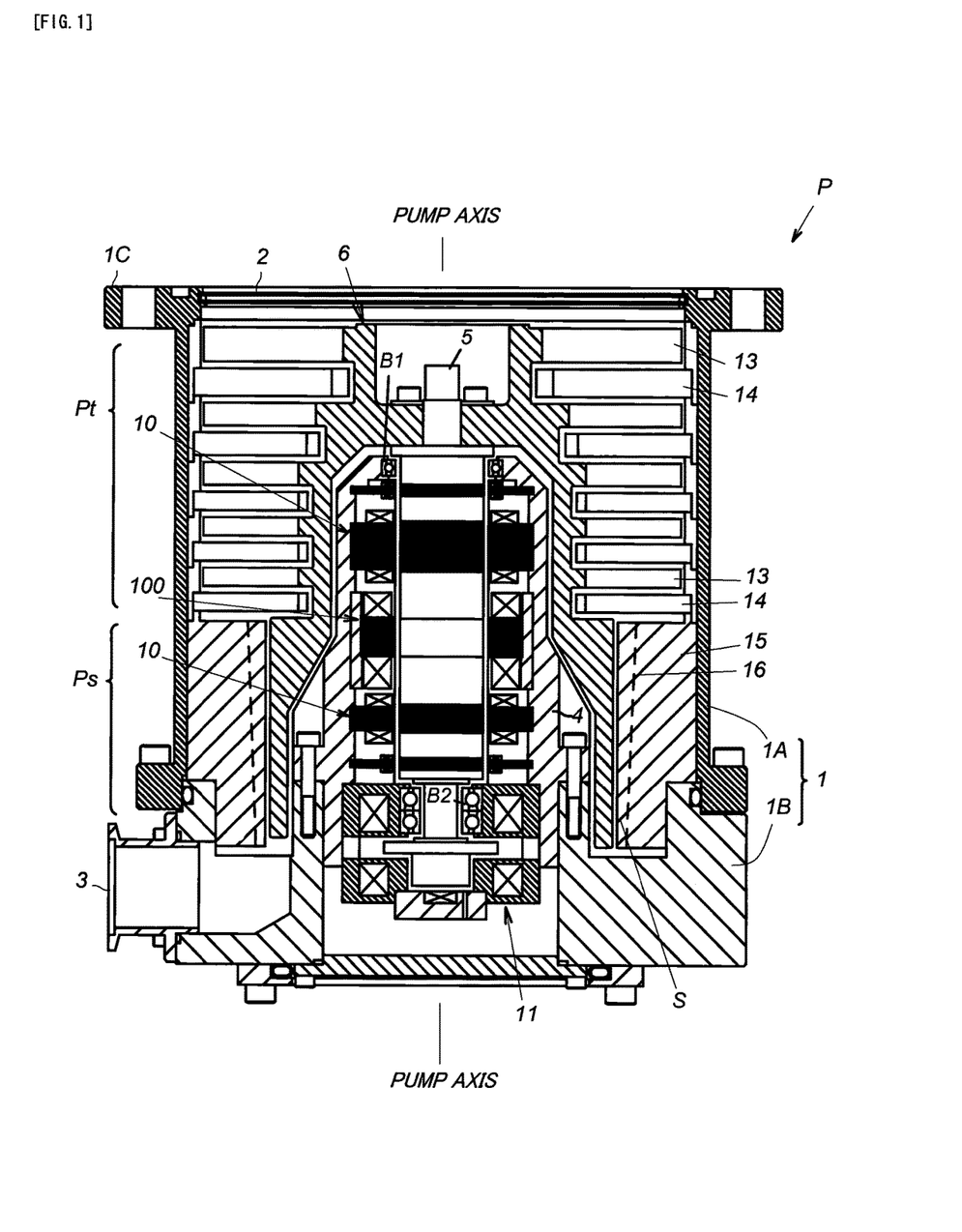
FIG. 1 is a cross-sectional view of a vacuum pump to which the present invention is applied.

FIG. 1 is a cross-sectional view of a vacuum pump to which the present invention is applied. The vacuum pump P in the drawing is used as a means of removing gases from a process chamber or other sealed chambers of a semiconductor production apparatus, a flat panel display production apparatus, and a solar panel production apparatus.

The vacuum pump P includes a bladed exhaust part Pt that exhausts gases with rotor blades 13 and stator blades 14, a threaded exhaust part Ps that exhausts gases by threads 16, and a system for driving these, inside an outer case 1.

The outer case 1 is constituted by a tubular pump case 1A and a tubular pump base 1B with a bottom axially joined together with bolts, so as to be formed in a bottomed cylindrical shape. The upper end of the pump case 1A is open as a gas inlet 2, while a gas outlet 3 is provided in a side face at a lower end of the pump base 1B.

The gas inlet 2 is connected to a sealed chamber (not shown) that is pumped to a high degree of vacuum such as a process chamber or the like of a semiconductor production apparatus, for example, with bolts (not shown) provided to a flange 1C at an upper edge of the pump case 1A. The gas outlet 3 is connected to and communicates with an auxiliary pump (not shown).

A cylindrical stator column 4 is provided in a central portion of the pump case 1A such as to stand upright for housing various electric components, with a lower end thereof being fastened to the pump base 1B with bolts.

Inside the stator column 4 is arranged a rotor shaft 5 such that an upper end thereof is oriented toward the gas inlet 2, while a lower end thereof is oriented toward the pump base 1B. The upper end of the rotor shaft 5 protrudes upwards from an upper end face of the cylindrical stator column 4.

The rotor shaft 5 is magnetically levitated and rotatably supported by radial magnetic bearings 10 and an axial magnetic bearing 11 in a radial direction and in an axial direction, and driven to rotate by an IPM motor 100 for a vacuum pump according to the present invention to be described later in detail. Protection bearings B1 and B2 are also provided to upper and lower ends of this rotor shaft 5.

A rotor 6 is provided outside of the stator column 4. The rotor 6 is cylindrical and surrounds the outer circumference of the stator column 4. The rotor 6 is united with the rotor shaft 5 and configured to rotate inside the pump case 1A around the rotor shaft 5 as the rotation axis.

Therefore, in the vacuum pump P of FIG. 1, the rotor shaft 5, radial magnetic bearings 10, and axial magnetic bearing 11 function as a support means that supports the rotor 6 such as to be rotatable around its axis. Since the rotor 6 rotates integrally with the rotor shaft 5, the IPM motor 100 for a vacuum pump that rotates the rotor shaft 5 functions as a drive means that rotates the rotor 6.

The protection bearings B1 and B2, radial magnetic bearings 10, and axial magnetic bearing 11 are well known in the art and therefore a detailed description of their configurations will be omitted.

In the vacuum pump P of FIG. 1, an upstream part from about a midpoint of the rotor 6 (area from about a midpoint to an end of the rotor 6 on the gas inlet 2 side) functions as the bladed exhaust part Pt. The detailed configuration of this bladed exhaust part Pt will be described below.

A plurality of rotor blades 13 are integrally formed on an outer circumferential surface of the upstream part of the rotor 6 from about the midpoint of the rotor 6. These plurality of rotor blades 13 protrude radially from the outer circumferential surface of the rotor 6 and arranged radially around the rotation axis of the rotor 6 (rotor shaft 5) or the axis of the outer case 1 (hereinafter, "pump axis"). The rotor blades 13 are formed based on machining, with the machining being implemented integrally with radial outer parts of the rotor 6, and is inclined at an angle optimal for removing gas molecules.

A plurality of stator blades 14 are formed on an inner circumferential surface of the pump case 1A such as to protrude radially from the inner circumferential surface of the pump case 1A toward the outer circumferential surface of the rotor 6, and arranged radially around the pump axis.

These stator blades 14 are also inclined at an angle optimal for removing gas molecules similarly to the rotor blades 13.

In the vacuum pump P of FIG. 1, these plurality of rotor blades 13 and stator blades 14 are alternately arranged along the pump axis in multiple stages to form the multistage bladed exhaust part Pt.

In the bladed exhaust part Pt configured as described above, when the IPM motor 100 for a vacuum pump is activated, the rotor shaft 5, rotor 6, and the plurality of rotor blades 13 all rotate together at a high speed, whereby the uppermost rotor blade 13 imparts a downward momentum to gas molecules coming in from the gas inlet 2. The gas molecules with the downward momentum are conveyed by the stator blade 14 to the next rotor blade 13. Such imparting of momentum to, and conveyance of, gas molecules are repeated in multiple stages, so that the gas molecules on the gas inlet 2 side are moved downstream of the rotor 6 successively and exhausted.

In the vacuum pump P of FIG. 1, a downstream part from about a midpoint of the rotor 6 (area from about a midpoint to an end of the rotor 6 on the gas outlet 3 side) functions as the threaded exhaust part Ps. The detailed configuration of this threaded exhaust part Ps will be described below.

The downstream part from about the midpoint of the rotor 6 is a part that rotates as a rotating member of the threaded exhaust part Ps and arranged inside the stator 15 of the threaded exhaust part.

The stator 15 of the threaded exhaust part is a cylindrical stationary member and arranged such as to surround the outer circumference of the rotor 6 (downstream part from about the midpoint of the rotor 6). The stator 15 of the threaded exhaust part is installed such that its lower end is supported by the pump base 1B.

A thread 16 is formed in an inner circumferential part of the stator 15 of the threaded exhaust part with its depth being reduced downwards so that the threaded exhaust part has a tapered cone shape. The thread 16 is cut spirally from an upper end to a lower end of the stator 15 of the threaded exhaust part, so that a spiral threaded exhaust passage S is formed between the rotor 6 and the stator 15 of the threaded exhaust part. Although not shown, in an alternative configuration, such a thread 16 may be formed in an inner circumferential surface of the rotor 6 to form the threaded exhaust passage S.

The depth of the thread 16 is largest at an upstream entrance (open end of the passage closer to the gas inlet 2) and smallest at a downstream exit (open end of the passage closer to the gas outlet 3) in order to compress the gas as the gas is transferred, by drag effects on the thread 16 and the outer circumferential surface of the rotor 6 in the threaded exhaust part Ps.

The upstream entrance of the threaded exhaust passage S is in communication with a gap G formed downstream of a lowermost blade (the lowermost stator blade 14 in the example of FIG. 1) of the rotor blades 13 and stator blades 14 arranged in multiple stages. The downstream exit of the threaded exhaust passage S is in communication with the gas outlet 3.

Gas molecules that have been conveyed by the previously explained exhausting action of the bladed exhaust part Pt and reached the lowermost blade (the lowermost rotor blade 13 in the example of FIG. 1) move into the threaded exhaust passage S from the upstream entrance thereof. As the gas molecules thus moving down toward the gas outlet 3 are compressed, the flow regime changes from transitional flow to viscous flow by the effects caused by the rotation of the rotor 6, i.e., drag effects that occur between the outer circumferential surface of the rotor 6 and the thread 16, and eventually the gas molecules are exhausted to the outside via an auxiliary pump (not shown).

FIG. 2A is a plan view and FIG. 2B is a cross-sectional view of A-A in FIG. 2A, illustrating the detailed configuration of an IPM motor for a vacuum pump according to the present invention.

The IPM motor 100 for a vacuum pump in the drawing is configured as an IPM motor with four poles and twenty-four slots, and is formed by a rotor core 110 having a plurality of magnet slots 111 in which magnets (permanent magnets) per pole are embedded, and a stator core 120 surrounding this rotor core 110 and having a plurality of winding slots 121 that house windings 122 for producing three-phase current of U, V, and W.

The rotor core 110 and the stator core 120 are each formed by stacking sheet-like iron cores to a predetermined thickness.

Figure 2:
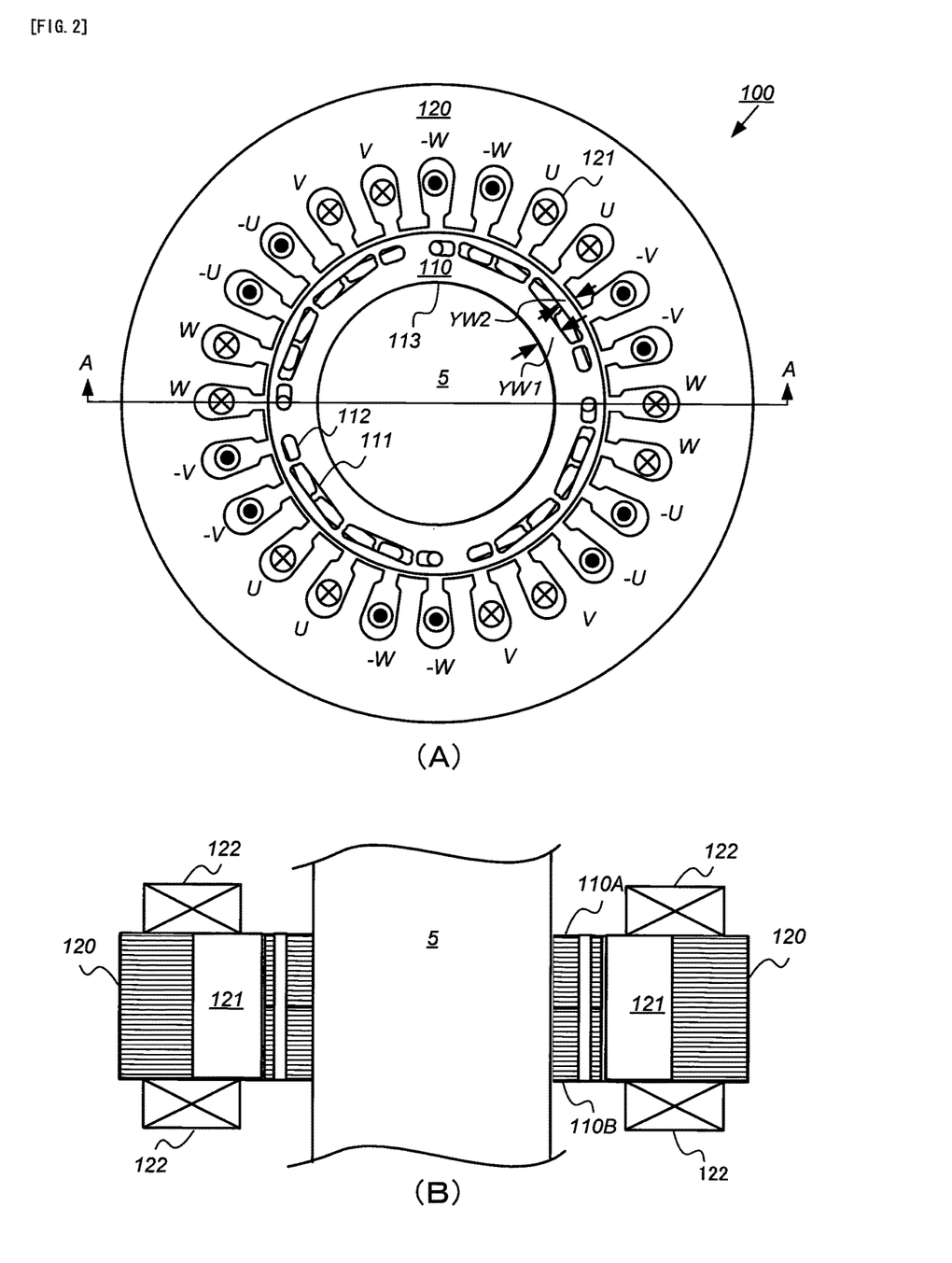
FIG. 2A is a plan view and FIG. 2B is a cross-sectional view of A-A in FIG. 2A, illustrating the detailed configuration of an IPM motor for a vacuum pump according to the present invention.

Although the windings 122 for producing three-phase current of U, V, and W are alternately wound through the winding slots 121 in FIG. 2, the method of winding the U-, V-, and W-windings 122 is not limited to this approach, and various other known winding methods may be adopted, as long as the windings 122 can generate a rotating magnetic field.

In the IPM motor 100 of this embodiment, the rotor shaft 5 of the vacuum pump P is pressed into a hole 113 formed in the rotor core 110. Since the rotor shaft 5 needs to have a diameter of a certain value or more in order to reduce natural vibration during the high-speed rotation of the vacuum pump P, if the vacuum pump P is to be reduced in size, the rotor shaft 5 will take up more volume relative to the rotor core 110, so that core width YW1 between the magnets 130 in the rotor core 110 and the inner circumference of the rotor core, and core width YW2 between the magnets 130 in the rotor core 110 and the outer circumference of the rotor core, will be smaller.

If the magnet of each pole consists of a single magnet, the rotor core or magnets may not be able to withstand the pressure during the process of pressing in the rotor shaft 5 of the vacuum pump P and break. Therefore, in the IPM motor 100 of this embodiment, the magnet of each pole is split into two pieces, and the two magnet pieces are embedded in separate magnet slots 111.

This IPM motor 100 for a vacuum pump employs a step-skewed configuration in which magnets are split in two in the axial direction and upper and lower magnets are offset from each other by a predetermined angle so as to reduce torque ripple caused by the sixth harmonic component of the drive frequency and cogging torque caused by the twelfth harmonic component of the drive frequency.

Therefore, the rotor core 110 includes an upper rotor core 110A and a lower rotor core 110B, which is each formed with 4×2=8 magnet slots 111, while twenty-four winding slots 121 are formed in the stator core 120.

In the IPM motor 100 of this embodiment, moreover, a total of eight holes 112 for stress concentration relaxation are formed, each at either end of the magnet slots 111 of each pole for enabling the rotor core 110 to withstand the centrifugal force during the high-speed rotation of the vacuum pump P.

These stress-concentration relaxation holes 112 are used for positioning of, and adjustment of skew angle between, the upper and lower rotor cores 110A and 110B as will be described later in detail and also have an effect of reducing magnetic flux leakage from ends of magnets 130 embedded in the magnet slots 111.

FIG. 3A is a plan view and FIG. 3B is a cross-sectional view of B-B in FIG. 3A, illustrating the detailed configuration of the rotor core 110 of the IPM motor for a vacuum pump according to the present invention.

In the drawing, the rotor core 110 has a total of eight magnet slots 111 for embedding magnets 130 split in two and a total of eight holes 112 for stress concentration relaxation.

The stress-concentration relaxation hole 112a is formed adjacent one 111a of the magnets split in two (111a, 111b), while the stress-concentration relaxation hole 112b is formed adjacent the other one 111b of the magnets split in two (111a, 111b). The hole 113 for pressing in the rotor shaft 5 of the vacuum pump P is formed in this rotor core 110.

The upper rotor core 110A and the lower rotor core 110B of this IPM motor 100 for a vacuum pump having a step-skewed design are shaped and configured the same as the rotor core 110 shown in FIG. 2A, and positioning of, and adjustment of skew angle between, the upper rotor core 110A and the lower rotor core 110B are achieved by utilizing the holes 112a and 112b for stress concentration relaxation.

Figure 4:
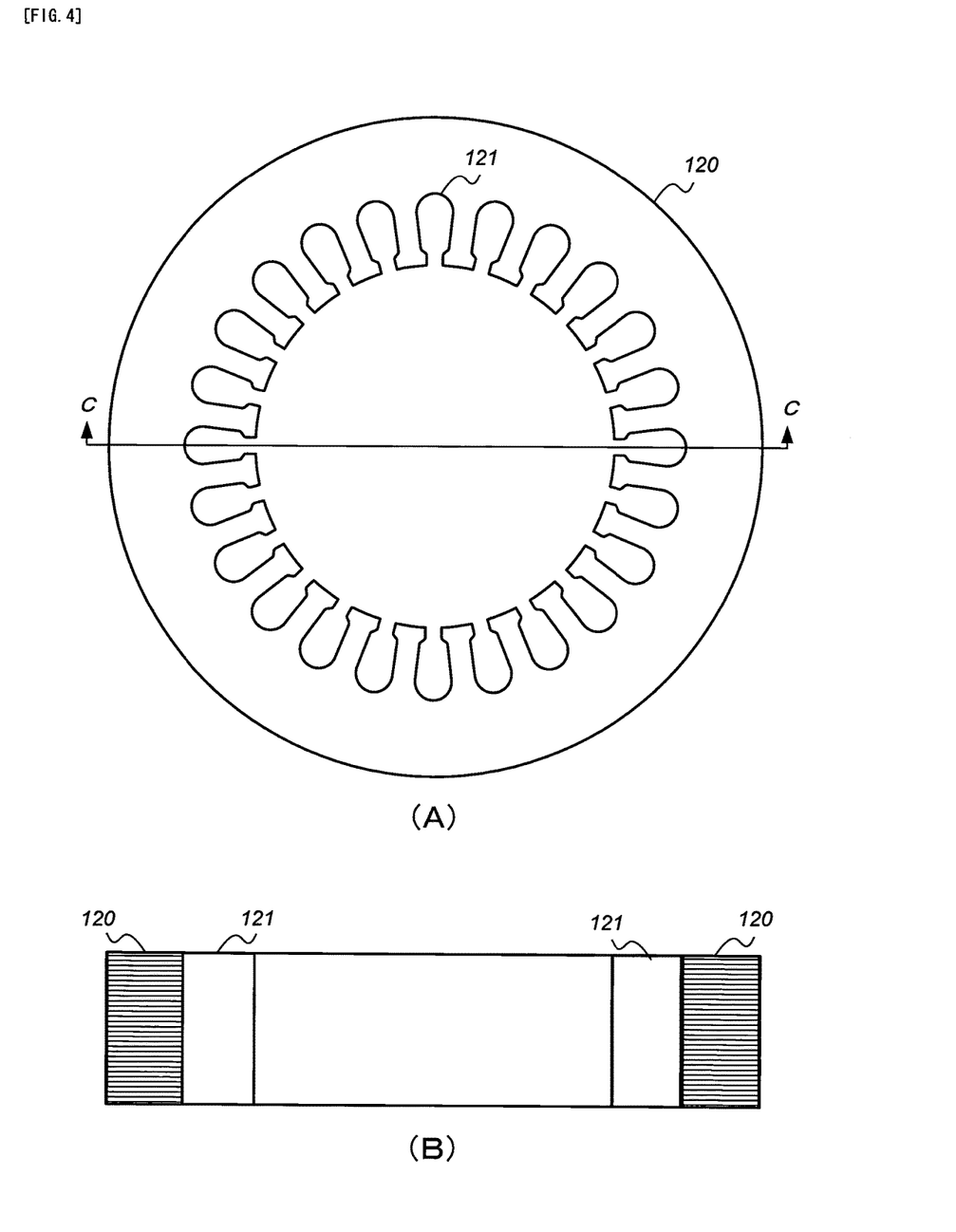
FIG. 4A is a plan view and FIG. 4B is a cross-sectional view of C-C in FIG. 4A, illustrating the detailed configuration of a stator core of the IPM motor for a vacuum pump according to the present invention.
Figure 5:
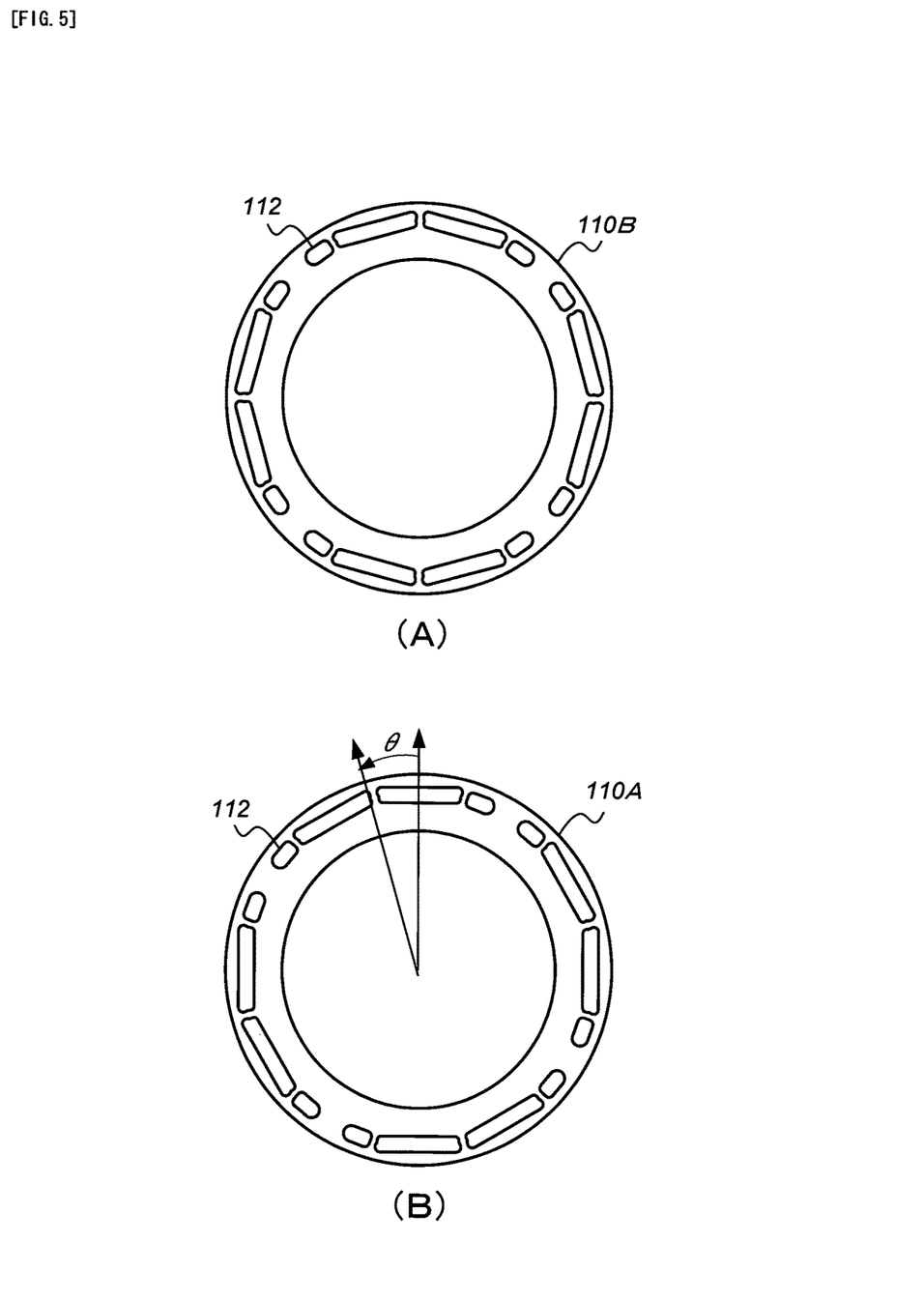
FIG. 5A and FIG. 5B are diagrams illustrating an example of an upper rotor core and a lower rotor core.
Figure 6:
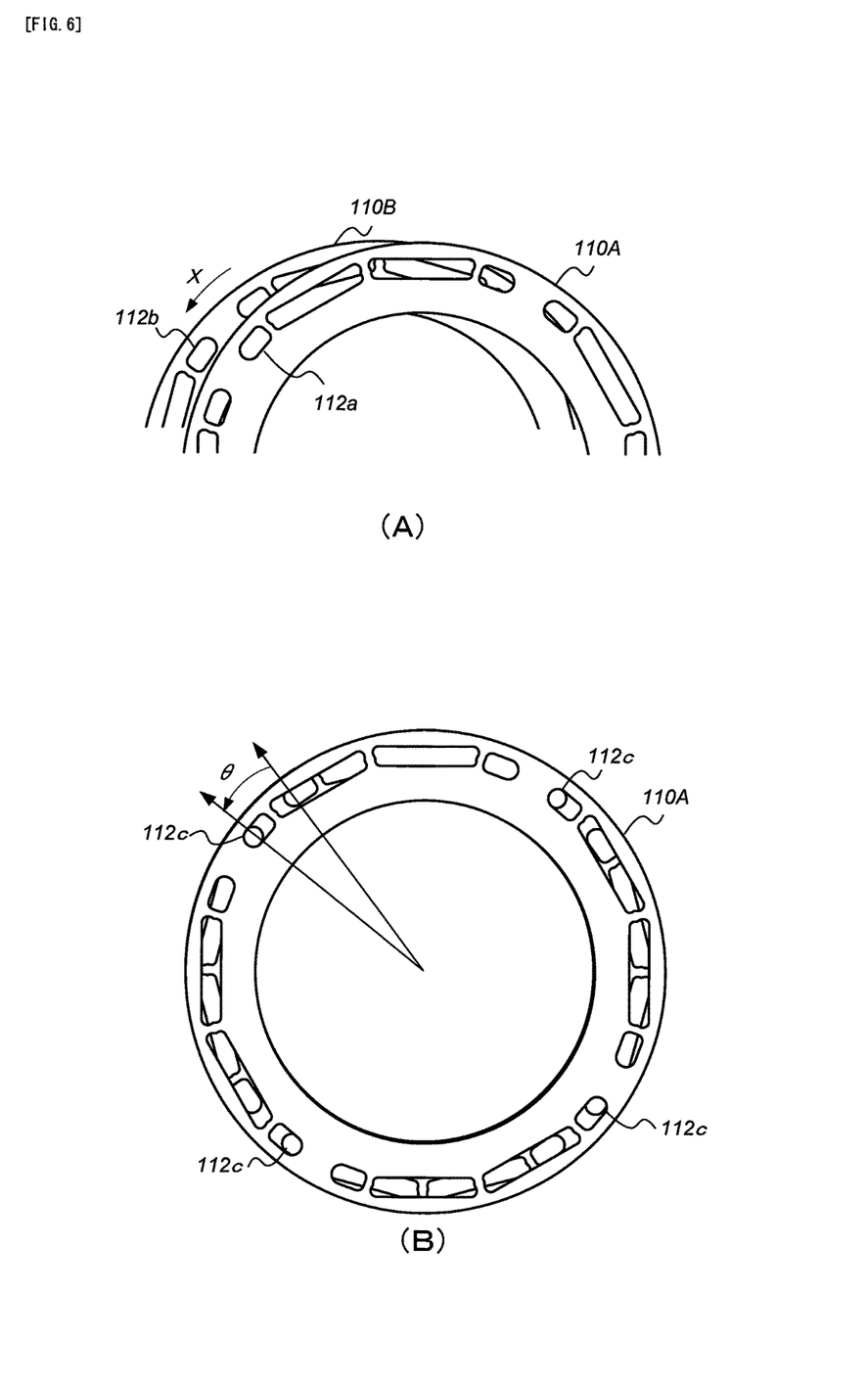
FIG. 6A and FIG. 6B are diagrams for explaining positioning of, and adjustment of skew angle between, the upper rotor core and the lower rotor core.

FIG. 4A is a plan view and FIG. 4B is a cross-sectional view of C-C in FIG. 4A, illustrating the detailed configuration of the stator core of the IPM motor for a vacuum pump according to the present invention.

In the drawing, the stator core 120 has a total of twenty-four winding slots 121 for housing windings 122 for producing three-phase current of U, V, and W. U-phase, V-phase, and W-phase windings 122 shown in FIG. 2 are housed in these twenty-four winding slots 121, and by producing three-phase current of U, V, and W in these U-phase, V-phase, and W-phase windings 122, a rotating magnetic field is generated inside the stator core 120.

Figure 3:
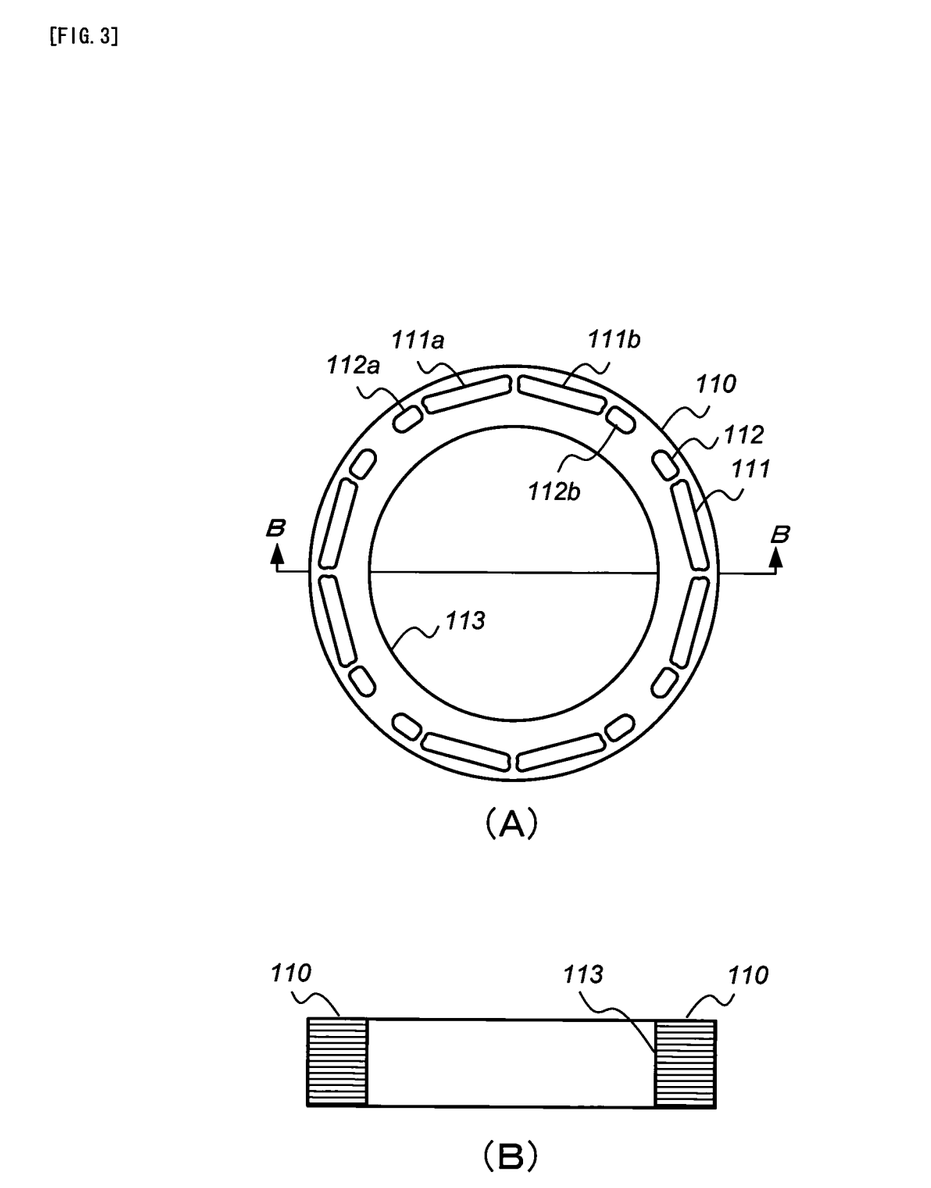
FIG. 3A is a plan view and FIG. 3B is a cross-sectional view of B-B in FIG. 3A, illustrating the detailed configuration of a rotor core of the IPM motor for a vacuum pump according to the present invention.

Inside the stator core 120 are arranged the upper rotor core 110A and the lower rotor core 110B shaped and configured the same as the rotor core 110 shown in FIG. 3 with magnets embedded in each pole and stacked with a predetermined skew angle, as shown in FIG. 2.

Next, the positioning of, and adjustment of skew angle between, the upper rotor core and the lower rotor core will be described with reference to FIG. 5 to FIG. 8.

FIG. 5A and FIG. 5B are diagrams illustrating an example of an upper rotor core and a lower rotor core. FIG. 5A shows the lower rotor core 110B, while FIG. 5B shows the upper rotor core 110A. As is clear from FIG. 5A and FIG. 5B, the upper rotor core 110A shown in FIG. 5B is rotated counterclockwise by a predetermined skew angle θ relative to the lower rotor core 110B shown in FIG. 5A.

In this embodiment, the positioning of, and adjustment of skew angle between, the upper rotor core 110A and the lower rotor core 110B are achieved by utilizing the eight holes 112 for stress concentration relaxation provided to each of the upper and lower rotor cores 110A and 110B.

To position and adjust skew angle between the upper rotor core 110A and the lower rotor core 110B, the lower rotor core 110B is fixed in position, while the upper rotor core 110A is rotated counterclockwise as indicated by arrow X in FIG. 6A. When the tip of the hole 112a of the upper rotor core 110A overlaps the hole 112b of the lower rotor core 110B and when four through holes 112c that are substantially true circle and extend through the upper rotor core 110A and lower rotor core 110B are formed, it is determined that the upper rotor core 110A and lower rotor core 110B have been positioned and the skew angle has been adjusted.

With the positioning of, and adjustment of skew angle between, the upper rotor core 110A and the lower rotor core 110B being complete, the upper rotor core 110A and lower rotor core 110B are secured to each other.

The upper rotor core 110A and lower rotor core 110B may be secured to each other by fitting and pressing in four shafts into the four through holes 112C that are formed when the positioning of, and adjustment of skew angle between, the upper rotor core 110A and lower rotor core 110B are complete, or, the upper rotor core 110A and lower rotor core 110B may be bonded to each other by a known bonding means.

This way, the positioning of, and adjustment of skew angle between, the upper rotor core 110A and lower rotor core 110B are carried out easily.

Figure 7:
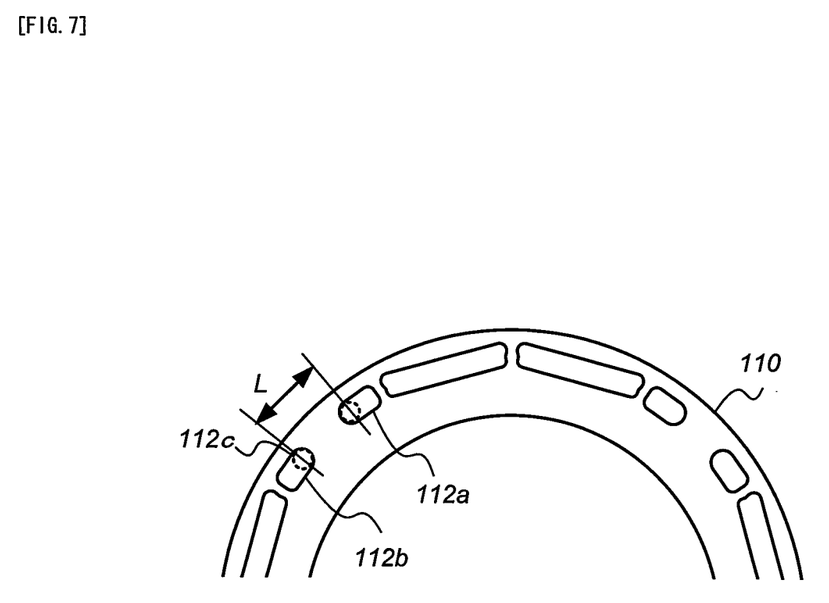
FIG. 7 is a diagram for explaining adjustment of the skew angle between the upper rotor core and the lower rotor core.
Figure 8:
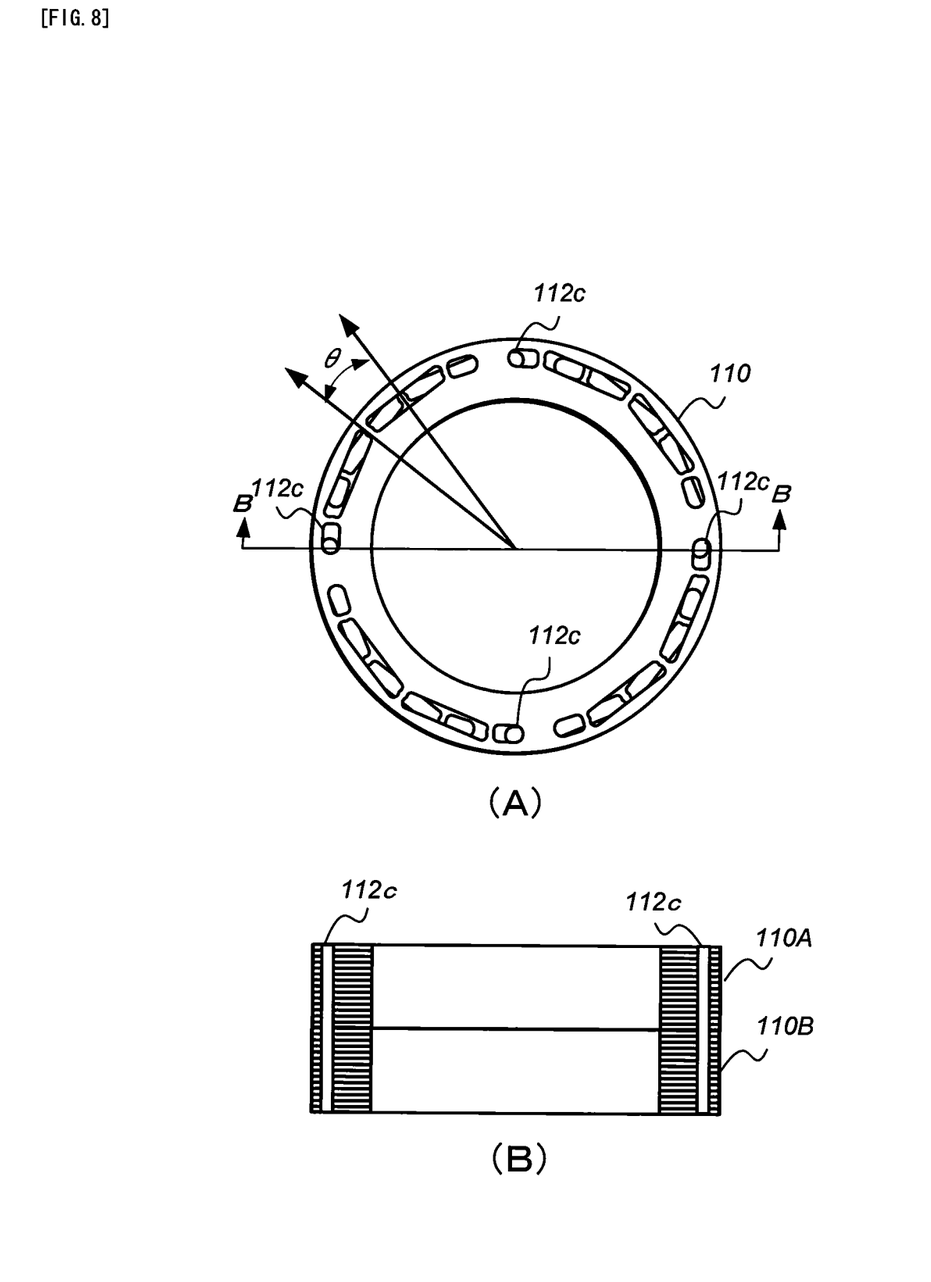
FIG. 8A is a plan view and FIG. 8B is a cross-sectional view of B-B in FIG. 8A, illustrating a step-skewed rotor core 110, having an upper rotor core 110A and a lower rotor core 110B stacked upon one another, with the skew angle adjusted.

The skew angle between the upper rotor core 110A and lower rotor core 110B may be adjusted by changing the distance between the holes 112a and 112b for stress concentration relaxation of adjacent poles, more precisely, the dimension L between the centers of the through holes 112c shown in FIG. 7, from 0 to 15 degrees, for example.

Namely, the skew angle between the upper rotor core 110A and lower rotor core 110B may be made larger by forming the holes 112a and 112b for stress concentration relaxation of the rotor core 110 such that the dimension L shown in FIG. 7 is large. Conversely, the skew angle between the upper rotor core 110A and lower rotor core 110B may be made smaller by forming the holes 112a and 112b for stress concentration relaxation of the rotor core 110 such that the dimension L shown in FIG. 7 is small.

FIG. 8A is a plan view and FIG. 8B is a cross-sectional view of B-B in FIG. 8A, illustrating the step-skewed rotor core 110, having the upper rotor core 110A and the lower rotor core 110B stacked upon one another, with the skew angle adjusted.

As shown in the drawing, this rotor core 110 is formed by the upper rotor core 110A and lower rotor core 110B that are stacked upon one another with a skew angle θ, so that four through holes 112c extending through the upper rotor core 110A and lower rotor core 110B are formed by the holes 112 for stress concentration relaxation.

Figure 9:
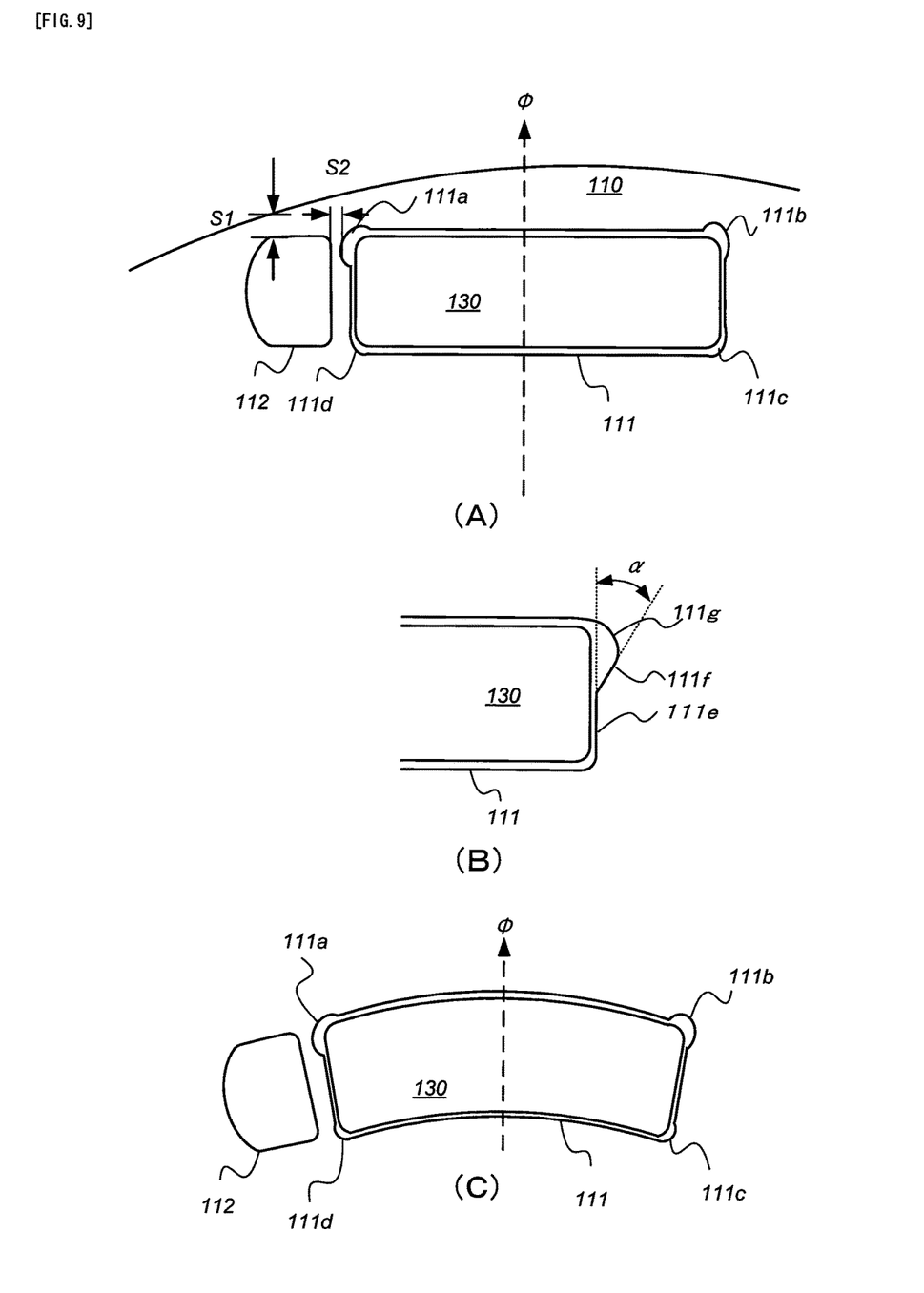
FIG. 9A to FIG. 9C are enlarged views for illustrating the details of magnetic slots and holes for stress concentration.

FIG. 9A is an enlarged view for explaining the details of magnetic slots and holes for stress concentration relaxation.

As shown in the drawing, the magnet slot 111 houses a magnet 130 embedded therein, and is shaped to have first corner portions 111a and 111b with a large radius of curvature at both corners on a radially outer side.

The slot also has second corner portions 111c and 111d with a smaller radius of curvature than that of the first corner portions 111a and 111 b at both corners on a radially inner side. The first corner portions 111a and 111b may have the same radius of curvature, or different radii of curvature, as long as they satisfy the condition of orientation in the radial direction. Similarly, the second corner portions 111c and 111d may have the same radius of curvature, or different radii of curvature.

The corner portion 111b shown in FIG. 9A may be formed by a straight part 111f extending at an angle α from a straight part 111e, and a curved part 111g as shown in FIG. 9B. The straight part 111e shown in FIG. 9B is used for positioning of the magnet 130, as with a corresponding straight part of the magnet slot 111 shown in FIG. 9A.

This characteristic design of the magnet slot 111 relaxes stress concentration caused by the centrifugal force on the magnets 130 embedded in the magnet slots 111 and the rotor core 110 itself during the high-speed rotation of the vacuum pump P, so that the rotor core 110 can withstand higher stress during the high-speed rotation of the vacuum pump P. The magnets 130 embedded in the rotor core 110 may not necessarily be flat as shown in FIG. 9A, but may be curved with a larger radius of curvature than that of the outer shape of the rotor core 110 as shown in FIG. 9C. In this case, the magnet slots 111 are also formed in a shape corresponding to such shape of the magnet 130.

Also as shown in the drawing, the distance S1 between the hole 112 for stress concentration relaxation and the circumferential surface of the rotor core 110, and the distance S2 between the magnet slot 111 and the hole 112 for stress concentration relaxation are small, so that magnetic resistance is high in these portions, and magnetic flux leakage from the ends of the magnets 130 can be reduced.

Namely, by the reduction of magnetic flux leakage from the ends of the magnets 130, a larger effective magnetic field φ is formed by the magnet 130 as compared to a rotor without the holes 112 for stress concentration relaxation, so that magnet torque can be utilized more effectively in the IPM motor 100 for a vacuum pump of this embodiment as compared a case where a rotor does not have the holes 112 for stress concentration relaxation.

Figure 10:
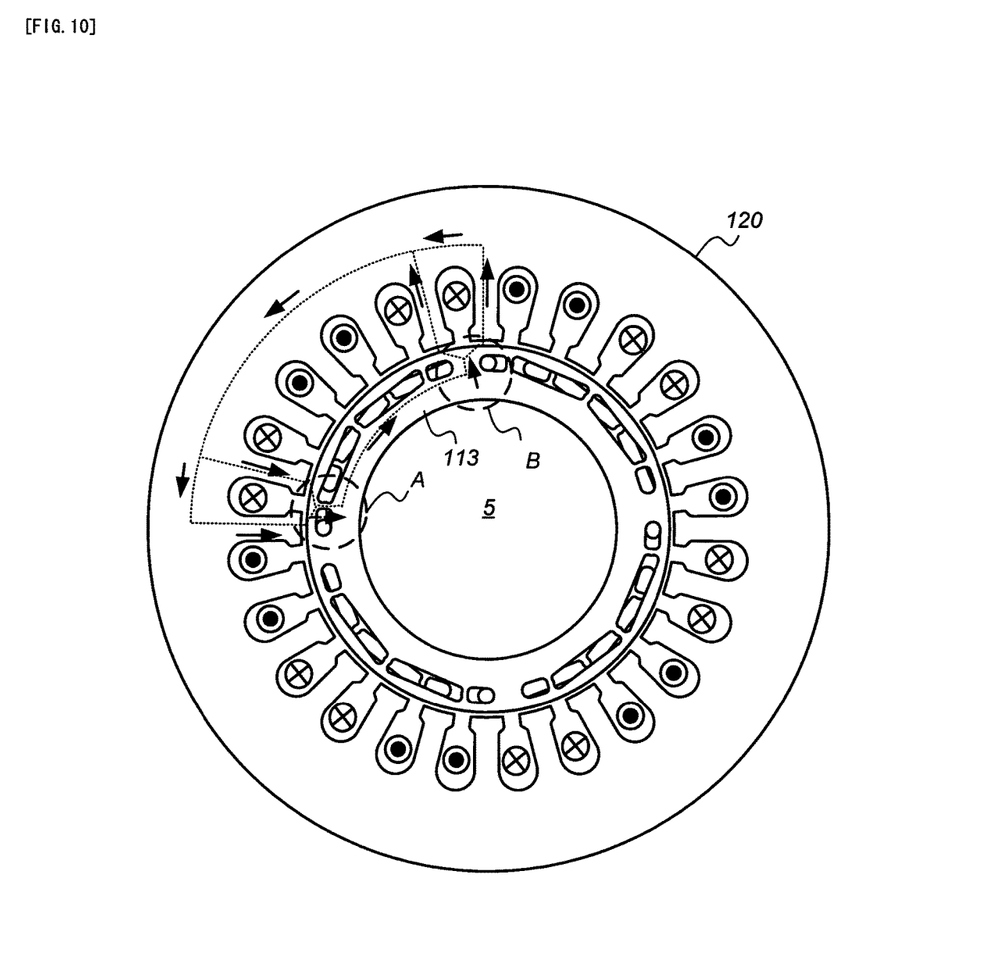
FIG. 10 is a diagram for explaining efficient use of reluctance torque in the IPM motor for a vacuum pump of the present invention.

FIG. 10 is a diagram for explaining efficient use of reluctance torque in the IPM motor for a vacuum pump of the present invention.

Commonly known IPM motors are capable of outputting high power despite the small size thereof by utilizing reluctance torque generated by magnetization of the rotor by a q-axis magnetic flux. However, in the IPM motor for a vacuum pump according to the present invention, the core width YW2 between the magnet 130 in the rotor core 110 and the outer circumference of the rotor core shown in FIG. 2 is very small.

Therefore, in the IPM motor 100 for a vacuum pump of this embodiment, for effective utilization of reluctance torque, a magnetic circuit design is employed for intensively guiding a magnetic flux in the rotor yoke 113 between the magnet 130 and the rotor shaft 5 as shown in FIG. 10.

Namely, in the IPM motor 100 for a vacuum pump of this embodiment, as the magnetic flux path is narrow in the parts where the holes 112 for stress concentration relaxation are formed in the upper rotor core 110A, the q-axis magnetic flux generated on the stator core 120 can hardly pass through these parts.

As mentioned in the foregoing, the skew angle between the upper rotor core 110A and lower rotor core 110B is set with the use of the holes 112 for stress concentration relaxation in the IPM motor 100 for a vacuum pump of this embodiment.

As a result, part A where a hole 112 for stress concentration relaxation is formed in the upper rotor core 110A corresponds to a portion between the stress-concentration relaxation holes 112 of adjacent poles in the lower rotor core 110B where the magnetic flux path is wide. Part B where a hole 112 for stress concentration relaxation is formed in the lower rotor core 110B corresponds to a portion between the stress-concentration relaxation holes 112 of adjacent poles in the upper rotor core 110A where the magnetic flux path is wide.

In the IPM motor 100 for a vacuum pump of this embodiment, therefore, magnetic circuits are formed for intensively guiding a q-axis magnetic flux between holes 112 for stress concentration relaxation of adjacent poles in the lower rotor core 110B in portions A of the upper rotor core 110A where the holes 112 are formed. Conversely, a q-axis magnetic flux is guided intensively between holes 112 for stress concentration relaxation of adjacent poles in the upper rotor core 110A in portions B of the lower rotor core 110B where the holes 112 are formed.

With this configuration, as q-axis magnetic fluxes pass through the rotor yoke 113 between the magnets 130 and the rotor shaft 5 intensively, the reluctance torque generated by magnetization of the rotor core 110 with the use of q-axis magnetic fluxes can be effectively utilized.

Figure 11:
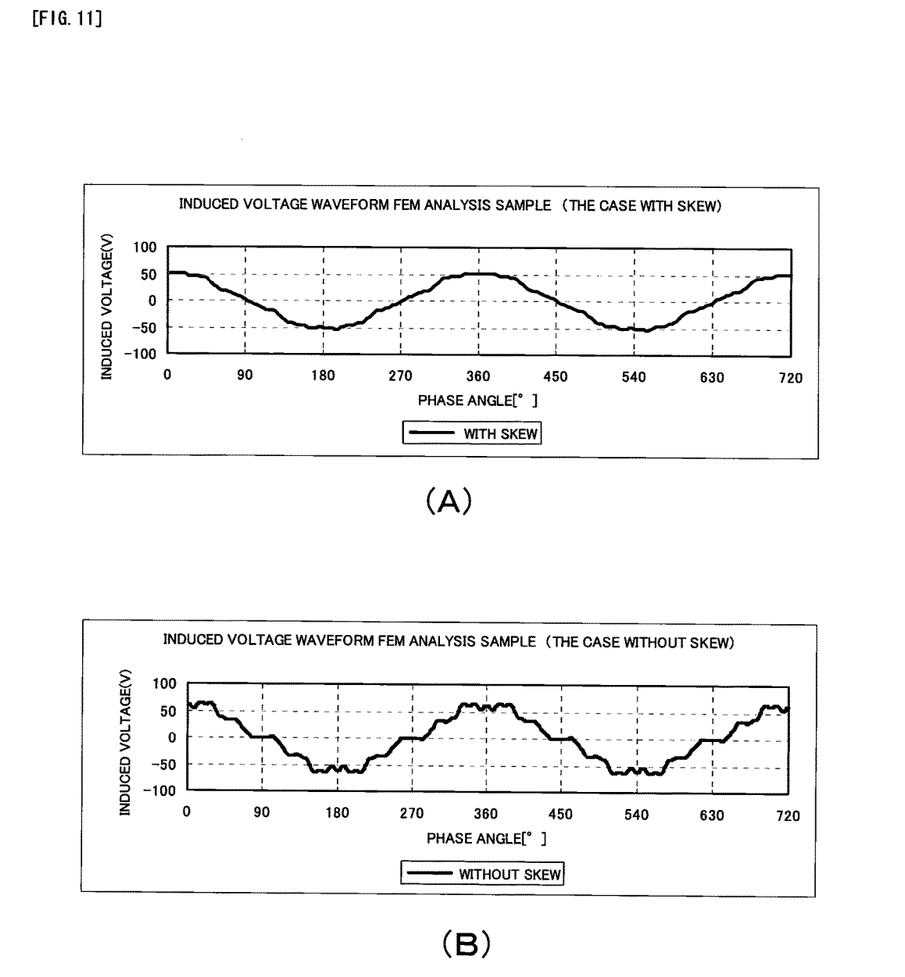
FIG. 11A and FIG. 11B are graphs illustrating reduction of harmonic components in induced voltage that contributes to reduction of torque ripple caused by a sixth harmonic component and cogging torque caused by a twelfth harmonic component in the IPM motor 100 for a vacuum pump according to an embodiment.

FIG. 11A and FIG. 11B are graphs illustrating reduction of harmonic components in induced voltage that contributes to reduction of torque ripple caused by a sixth harmonic component and cogging torque caused by a twelfth harmonic component in the IPM motor 100 for a vacuum pump according to an embodiment.

In the IPM motor 100 for a vacuum pump of this embodiment, the magnet of each pole is split into two pieces, and the two magnet pieces are embedded in separate magnet slots 111. A predetermined skew angle is set between the upper rotor core 110A and the lower rotor core 110B.

As a result, as shown in FIG. 11A, with a skew angle set between the upper rotor core 110A and the lower rotor core 110B, the induced voltage waveform appears close to a sinusoidal wave as compared to the case without a skew angle shown in FIG. 11B, so that torque ripple caused by a sixth harmonic component and cogging torque caused by a twelfth harmonic component can be reduced significantly.

In the IPM motor 100 for a vacuum pump of this embodiment, the magnet of each pole is split into two pieces, and the two magnet pieces are embedded in separate magnet slots 111. Alternatively, the magnet of each pole may be split into three or more pieces, and these three or more magnet pieces may be embedded separately in corresponding magnet slots.

The IPM motor 100 for a vacuum pump of this embodiment employs a two layer structure with the upper rotor core 110A stacked upon the lower rotor core 110B with a predetermined skew angle. Alternatively, the rotor core may be configured with a multilayer structure with three or more rotor core laminations.

In this case, q-axis magnetic fluxes generated by applying current in stator windings for generating reluctance torque shall be guided intensively between the holes for stress concentration relaxation in respective rotor core laminations so as to form magnetic circuits extending across the stack of a multi-stage rotor core laminations.

The present invention is not limited to the embodiment described above and can be modified variously by the ordinary creative activity expected of a person skilled in the art within the scope of the technical idea of the present invention.

EXPLANATION OF REFERENCE NUMERALS

1: Pump outer case
1A: Pump case
1B: Pump base
1C: Flange
2: Gas inlet
3: Gas outlet
4: Stator column
5: Rotor shaft
6: Rotor
10: Radial magnetic bearing
11: Axial magnetic bearing
13: Rotor blade
14: Stator blade
15: Stator of the threaded exhaust part
16: Thread
100: IPM motor for a vacuum pump
110: Rotor core 110A: Upper rotor core
110B: Lower rotor core
111: Magnet slot
112: Hole for stress concentration relaxation
113: Hole
120: Stator core
121: Winding slot
122: Winding
B1, B2: Protection bearing
P: Vacuum pump
Pt: Bladed exhaust part
Ps: Threaded exhaust part
S: Threaded exhaust passage

What is claimed is:

1. An Interior Permanent Magnet (IPM) motor for a vacuum pump, comprising:
   a rotor core, wherein a rotor shaft of the vacuum pump is pressed into the rotor core, and wherein the rotor core has magnets embedded therein; and
   a stator core that surrounds the rotor core, wherein stator windings are wound around the stator core, wherein
     the magnets embedded in the rotor core are arranged as a plurality of rotor magnet poles,
     each magnet of a respective rotor magnet pole is split into a plurality of pieces and inserted in respective magnet slots of the respective rotor magnet pole in the rotor core,
     at least two holes for stress concentration relaxation are provided in between adjacent magnet slots of adjacent rotor magnet poles,
     a distance between adjacent holes of the at least two holes for stress concentration relaxation between magnet slots of adjacent rotor magnet poles is wider than a distance between a hole for stress concentration relaxation and a nearest magnet slot,
     the rotor core has a multiple layer structure having at least an upper rotor core layer and a lower rotor core layer stacked vertically in an axial direction of the rotor core, and wherein the holes for stress concentration relaxation are located in the upper and lower rotor core layers to set a skew angle between the upper and lower rotor core layers,
     a magnetic circuit is formed so that the magnetic circuit extends across the upper and lower rotor core layers by passing a first q-axis magnetic flux that generates reluctance torque between the holes for stress concentration relaxation of adjacent poles in the upper rotor core layer and in at least a portion of the holes for stress concentration relaxation of the lower rotor core layer, and a second q-axis magnetic flux that generates reluctance torque between the holes for stress concentration relaxation of adjacent poles in the lower rotor core layer and in at least a portion of the holes for stress concentration relaxation of the upper rotor core layer.

2. A vacuum pump comprising an Interior Permanent Magnet (IPM) motor comprising:
   a rotor core, wherein a rotor shaft of the vacuum pump is pressed into the rotor core, and wherein the rotor core has magnets embedded therein; and
   a stator core that surrounds the rotor core, wherein stator windings are wound around the stator core, wherein
     the magnets embedded in the rotor core are arranged as a plurality of rotor magnet poles,
     each magnet of a respective rotor magnet pole is split into a plurality of pieces and inserted in respective magnet slots of the respective rotor magnet pole in the rotor core,
     at least two holes for stress concentration relaxation are provided in between adjacent magnet slots of adjacent rotor magnet poles,
     a distance between adjacent holes of the at least two holes for stress concentration relaxation between magnet slots of adjacent rotor magnet poles is wider than a distance between a hole for stress concentration relaxation and a nearest magnet slot,
     the rotor core has a multiple layer structure having at least two rotor core layers stacked vertically in an axial direction of the rotor core, and wherein the holes for stress concentration relaxation are located in the respective rotor core layers to set a skew angle between the respective rotor core layers,
     a magnetic circuit is formed so that the magnetic circuit extends across the at least two rotor core layers by passing a first q-axis magnetic flux that generates reluctance torque between the holes for stress concentration relaxation of adjacent poles in a first rotor core layer of the at least two rotor core layers and in at least a portion of the holes for stress concentration relaxation of a second rotor core layer of the at least two rotor core layers, and a second q-axis magnetic flux that generates reluctance torque between the holes for stress concentration relaxation of adjacent poles in the second rotor core layer of the at least two rotor core layers and in at least a portion of the holes for stress concentration relaxation of the first rotor core layer of the at least two rotor core layers.

3. The IPM motor for a vacuum pump according to claim 1, wherein the magnet slots have a first corner portion for stress concentration relaxation at a corner on a radially outer side, and a second corner portion with a smaller radius of curvature than that of the first corner portion at a corner on a radially inner side.

4. The IPM motor for a vacuum pump according to claim 1, wherein a distance between two adjacent holes for stress concentration in a respective rotor core layer sets the skew angle between respective core layers.

* * * * *